United States Patent
Bhagavatula et al.

(10) Patent No.: US 7,228,033 B2
(45) Date of Patent: Jun. 5, 2007

(54) OPTICAL WAVEGUIDE LENS AND METHOD OF FABRICATION

(75) Inventors: Venkata A. Bhagavatula, Big Flats, NY (US); John Himmelreich, Horseheads, NY (US); Gregory E. Williams, Fayetteville, GA (US); Ljerka Ukrainczyk, Painted Post, NY (US); Robert S. Wagner, Corning, NY (US)

(73) Assignee: Corning Incorporated, Corning, NY (US)

(*) Notice: Subject to any disclaimer, the term of this patent is extended or adjusted under 35 U.S.C. 154(b) by 370 days.

(21) Appl. No.: 09/812,108

(22) Filed: Mar. 19, 2001

(65) Prior Publication Data

US 2002/0009261 A1 Jan. 24, 2002

Related U.S. Application Data

(60) Provisional application No. 60/190,200, filed on Mar. 17, 2000.

(51) Int. Cl.
*G02B 6/32* (2006.01)

(52) U.S. Cl. .......................... 385/35; 385/33

(58) Field of Classification Search ............... 385/35, 385/33, 70, 55, 58, 60, 61
See application file for complete search history.

(56) References Cited

U.S. PATENT DOCUMENTS

| | | | |
|---|---|---|---|
| 4,269,648 A | 5/1981 | Dakss et al. ............... 156/293 |
| 4,497,536 A | * 2/1985 | Payne et al. ................. 385/61 |
| 4,671,613 A | * 6/1987 | Buhrer ........................ 385/36 |
| 4,701,011 A | 10/1987 | Emkey et al. ............ 350/96.18 |
| 4,737,006 A | 4/1988 | Warbrick ................ 350/96.18 |
| 4,844,580 A | * 7/1989 | Lynch et al. ................. 385/35 |
| 4,854,663 A | * 8/1989 | Borsuk et al. ............... 385/33 |
| 4,962,988 A | 10/1990 | Swann ..................... 350/96.18 |
| 5,011,254 A | 4/1991 | Edwards et al. ......... 350/96.18 |
| 5,117,473 A | 5/1992 | Pan ............................. 385/33 |
| 5,172,271 A | 12/1992 | Sinclair ..................... 359/652 |
| 5,185,836 A | 2/1993 | Baker ......................... 385/61 |
| 5,282,088 A | 1/1994 | Davidson ................... 359/664 |

(Continued)

FOREIGN PATENT DOCUMENTS

| | | | |
|---|---|---|---|
| JP | 57-186722 | * | 11/1982 |
| JP | 04-288509 | | 2/1991 |
| JP | 64-50003 | * | 2/1999 |

OTHER PUBLICATIONS

"Silica GIO Fibers with high performance," Ogura et al., pp. ThC5–1 to ThC5–3.

Konno et al., Optical coupling between microlensed fiber terminals, OFC '95 Technical Digest, pp. 104–105.

Nobuo Imaizumi, Special Article: Emerging Photoelectronic Technology: In–line optical isolator, Electronic materials, Jul. 1997, pp. 70–74.

*Primary Examiner*—Chandrika Prasad
(74) *Attorney, Agent, or Firm*—Timothy M. Schaeberle; Siwen Chen

(57) ABSTRACT

A spherical lens formed by fusing a generally homogenous glass lens blank to the distal end of an optical fiber, heating and tensioning the lens blank to separate it in two segments with the segment attached to the optical fiber defining a tapered end, and heating the lens blank above its softening point so that the spherical lens forms. The lens blank is fabricated from a 4 weight percent borosilicate glass having a softening point less than that of the core of the optical fiber. The lens member defines a throat region adjacent the optical fiber whose cross-sectional dimension is substantially greater than the diameter of the optical fiber, but substantially less than the diameter of the spherical lens.

41 Claims, 8 Drawing Sheets

U.S. PATENT DOCUMENTS

| | | | | |
|---|---|---|---|---|
| 5,293,438 A | * | 3/1994 | Konno et al. | 385/35 |
| 5,384,874 A | | 1/1995 | Hirai et al. | 385/34 |
| 5,402,510 A | | 3/1995 | Kalonki et al. | 385/33 |
| 5,457,759 A | | 10/1995 | Kalonji et al. | 385/31 |
| 5,459,803 A | | 10/1995 | Yamane et al. | 385/33 |
| 5,551,968 A | * | 9/1996 | Pan | 65/387 |
| 5,608,831 A | | 3/1997 | Pan | 385/85 |
| 5,617,495 A | * | 4/1997 | Funabashi et al. | 385/92 |
| 5,841,921 A | | 11/1998 | Wallace | 385/46 |
| 5,917,985 A | | 6/1999 | Im | 385/140 |
| 5,967,653 A | * | 10/1999 | Miller et al. | 385/43 |
| 6,033,515 A | | 3/2000 | Walter et al. | 156/272.8 |

* cited by examiner

OPTICAL WAVEGUIDE LENS AND METHOD OF FABRICATION

This application claims the benefits of Provisional application No. 60/190,200 filed Mar. 17, 2000.

BACKGROUND OF THE INVENTION

1. Field of the Invention

The present invention relates generally to optical waveguide lenses used for collimating or focusing a light beam traversing free space in an optical component, and particularly to a spherical lens formed on the distal end of an optical fiber.

2. Technical Background

Advances in optical communications have generated significant need for optical components which involve light being transmitted to or from an optical fiber through free-space to interact with or pass through one or more optical device. A wide variety of passive and active optical devices exist, some simple examples including thin-film filters or birefringent elements, and some of the more complex being large scale three-dimensional switch fabrics. Other uses for free-space optical components include injecting light from a laser diode into an optical fiber, transmitting light through free-space from one optical fiber to another (such as an amplifier fiber), or projecting light from an optical fiber to a detector.

In optical components utilizing free-space transmission of light (sometimes called micro-optic components), the light beam is often either expanded and collimated into approximately parallel rays from the exposed end of an optical fiber, or conversely focused from an expanded beam into a narrower beam capable of being injected into the end of the optical fiber at a desired angle of incidence. While other functions may be performed on the light beam exiting or entering an optical fiber, collimating and focusing are the functions which are most commonly encountered in micro-optic components.

In order to accomplish the collimating or focusing functions within the specifications required for optical communications, cylindrically-shaped gradient-index (GRIN) lenses employing a graduated radial refractive index profile have become the most prevalent conventional alternative. However, commercially-available GRIN lenses are expensive, difficult to manufacture, and present certain disadvantages in assembling, aligning, and tuning the optical components.

Several other approaches to fabricating collimating or focusing lenses for optical components are known. Axial GRIN lenses, molded polymer and glass lenses having spherical and aspherical lens surfaces, composite or complex lens elements, optical fibers having integral lenses formed by processes such as thermal expansion or diffusion, and ball lenses are among the many alternatives.

One approach to producing a larger-diameter collimating or focusing lens attached to the end of an optical fiber involves fusing a cylindrical glass rod onto the end of the optical fiber, and heating the rod above its softening point so that surface tension forms the viscous melted glass into a spherical lens. The resulting lens will usually have a cylindrical section of equal diameter with the optical fiber, and a spherical section of larger diameter. A light beam exiting the end of the optical fiber will expand in the cylindrical portion of the lens at a rate dependent on the refractive index of the material, and continue expanding through the spherical portion until refracted at the interface between the spherical lens surface and the surrounding air. The expanded or collimated beam is approximated as parallel rays at an operating distance from the lens surface, but in fact has a region of progressively decreasing beam waist as the initial displacement from the lens surface increases. Spherical fiber lenses fabricated according to this technique have provided beam expansion by Gaussian diffusion from the 10 μm core of standard 125 μm diameter single-mode optical fiber to an expanded beam diameter of approximately 80 μm at the exit face of a lens having a 200 μm radius of curvature, with the beam converging to an approximately 30 μm beam diameter at the beam waist located 0.65 mm from the lens surface. For spherical fiber lenses having up to about 350 μm radii of curvature, beam diameters of up to about 120 μm could be achieved at a beam waist located approximately 4.5 mm from the lens surface, implying a 9 mm separation between a pair of collimating lenses having an optical device disposed in between within an optical component.

SUMMARY OF THE INVENTION

One aspect of the present invention is an optical-waveguide lens for collimating or focusing a light beam comprising an optical waveguide and a lens member connected to and extending from the end of the optical waveguide, wherein the lens member has a throat portion whose cross-sectional dimension is substantially greater than the diameter of the optical waveguide, and a generally spherical lens portion.

In another aspect, the present invention is an optical waveguide lens including an optical waveguide and a generally spherical lens member, wherein the mode field diameter or beam diameter of a light beam projected from the spherical lens member is greater than 100 μm measured at a displacement from the surface of the spherical lens member corresponding to the beam waist.

A further aspect of the present invention is an optical waveguide lens including an optical waveguide and a generally spherical lens member attached to the optical waveguide, the generally spherical lens being fabricated from a glass having a softening point less than that of the core of the optical waveguide.

In another aspect, the present invention is an optical waveguide lens including an optical waveguide and a generally spherical lens member attached to the optical waveguide, the generally spherical lens being fabricated from a borosilicate glass, and particularly a 4 mole percent borosilicate glass.

A further aspect of the present invention is a method for fabricating an optical waveguide lens comprising the steps of providing an optical waveguide, providing a lens blank defining a cross-sectional dimension substantially greater than the diameter of the optical waveguide, fusing the lens blank to the optical waveguide, heating a portion of the lens blank above its softening point, applying tension to the lens blank until it separates to form a segment having a tapered distal end connected to the optical waveguide, and heating the tapered distal end of the lens blank above its softening point such that a spherical lens portion is formed in alignment with the axis of the optical waveguide and through which the light beam is transmitted, the optical waveguide lens defining a throat portion disposed between the optical waveguide and the spherical lens portion whose cross-sectional dimension is substantially greater than the diameter of the optical waveguide and substantially less than the diameter of the spherical lens portion.

Another aspect of the present invention is a method for using an optical waveguide lens to fabricate an optical component comprising the steps of providing an optical fiber lens including an optical waveguide, a throat portion whose cross-sectional dimension is substantially greater than the diameter of the optical waveguide, and a generally spherical lens portion whose diameter is substantially greater than the cross-sectional dimension of the throat portion, positioning the optical fiber lens relative to the optical device such that the light beam propagates either from the optical fiber lens to the optical device or from the optical device to the optical fiber lens, or both and securing the optical fiber lens relative to the optical device.

A further aspect of the present invention is method for fabricating an optical waveguide lens assembly comprising the steps of providing an optical waveguide, providing a ferrule defining a bore and an end surface, inserting the optical waveguide through the bore such that a segment of the distal end of the optical waveguide is exposed, forming a lens member including a generally spherical portion on the distal end of the optical waveguide, retracting the optical waveguide through the bore at least until a portion of the lens member contacts the end surface of the ferrule, and securing the optical waveguide in position relative to the ferrule.

Another aspect of the present invention is a method for fabricating a plurality of generally spherical lenses each having a mounting post extending therefrom comprising the steps of providing an elongated stock of a glass material from which the plurality of spherical lenses are to be formed, forming a spherical lens on the distal end of the elongated stock by heating the glass material above its softening point such that a portion of the elongated stock forms the spherical lens due in part to a surface tension of the glass material, separating the spherical lens and a segment of the elongated stock connected thereto from a remaining portion of the elongated stock such that the segment connected to the spherical lens forms the mounting post for the spherical lens, and repeating the forming step and the separating step to fabricate the plurality of spherical lenses each having the mounting post extending therefrom.

A further aspect of the present invention is a pump multiplexer for combining a first optical signal from a pump light source with a second optical signal from a transmission waveguide into a common optical waveguide comprising a first input waveguide and a second input waveguide each having an end optically coupled to respective ones of the pump light source and the transmission waveguide, a birefringent material disposed so that the ends of the first and second input waveguides confront a first face of the birefringent material, and an output waveguide optically coupled to the common optical waveguide and confronting a second face of the birefringent material, wherein at least one of the first input waveguide, the second input waveguide, or the output waveguide have a generally spherical lens formed on the end thereof.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
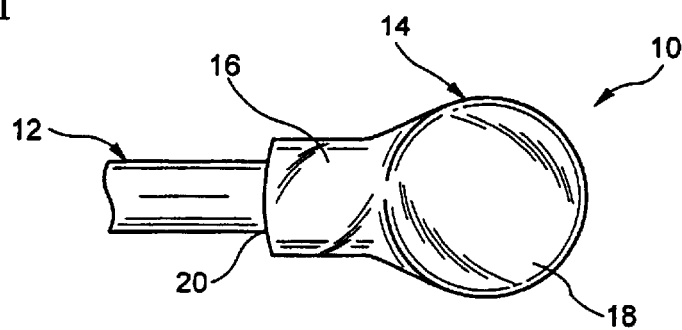
FIG. 1 is a micrograph showing a first embodiment of the optical waveguide lens of the present invention in which an individual optical waveguide is fused to a lens member having a throat portion and a spherical lens portion, the throat portion having a cross-sectional dimension substantially greater than the diameter of the optical waveguide.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the optical waveguide lens of the present invention is shown in FIG. 1, and is designated generally throughout by reference numeral 10.

In accordance with the invention, referring to FIGS. 1–6 it may be seen that the present invention for an optical waveguide lens 10 includes an optical waveguide 12, a lens member 14 having a throat portion 16 and a generally spherical lens portion 18. The lens member 14 is attached to the optical waveguide 12 at a junction 20 formed by fusion splicing the lens member 14 to the optical waveguide 12 according to the process described further below.

FIG. 1 depicts an optical waveguide lens 10 in which a conventional optical waveguide 12 (such as a single-mode optical fiber, multi-mode optical fiber, polarization-maintaining optical fiber, an optical fiber having a circular or noncircular cross-section, or a dual- or multi-core optical fiber) is optically coupled to a throat portion 16 of the lens member 14, the throat portion 16 having a cross-sectional dimension substantially greater than the diameter of the optical waveguide 12, and a spherical lens portion substantially greater in diameter than the throat portion.

Figure 2:
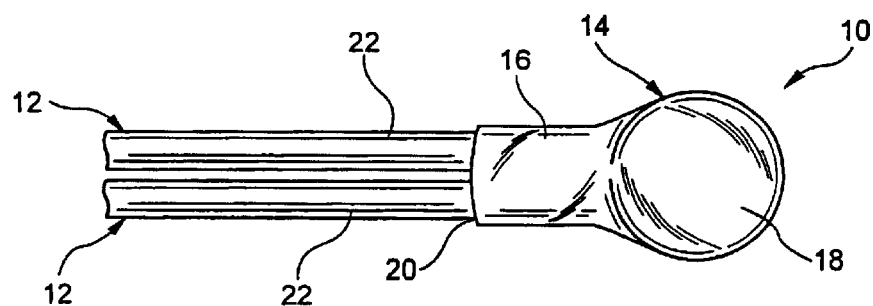
FIG. 2 is a micrograph showing an alternate embodiment of the optical waveguide lens of the present invention in which a pair of spaced-apart optical waveguides are fused to the lens member, the throat portion similarly having a cross-sectional dimension substantially greater than the diameter of each of the optical waveguides or their combined diameters.

FIG. 2 depicts an alternate embodiment of the optical waveguide lens 10 in which a pair of optical waveguides 12 are optically coupled to the throat portion 16 of the lens member 14 at distinct radial locations on the rear face 22 of the throat portion 16, and the optical waveguides 12 are disposed extending generally parallel to one another and spaced apart from one another along the length thereof adjacent to the lens member 14. The throat portion 16 has a cross-sectional dimension which is substantially greater than the diameter of either of the optical waveguides 12, and also substantially greater than the combined diameters of the two optical waveguides 12.

Figure 3:
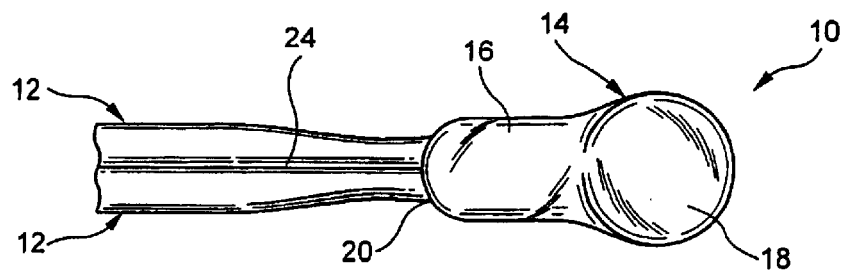
FIG. 3 is a micrograph showing an alternate embodiment of the optical waveguide lens of the present invention in which a pair of parallel adjoining optical waveguides are fused together along a restricted-diameter portion and optically coupled to the lens member, the throat portion similarly having a cross-sectional dimension substantially greater than the diameter of the optical waveguides or the restricted-diameter portion.

FIG. 3 depicts an alternate embodiment of the optical waveguide lens 10 in which a pair of optical waveguides 12 are fused together at a restricted-diameter portion 24 directly adjacent or closely proximate to the junction 20 with the lens member 14, and are each optically coupled to the throat portion 16 of the lens member 14 with the cores of the optical waveguides substantially closer than the case of the two radially-displaced optical waveguides 12 shown in FIG. 2. The throat portion 16 has a cross-sectional dimension which is substantially greater than the diameter of the restricted-diameter portion 24 of the fused optical waveguides 12 or the diameters of the individual optical waveguides 12. The optical waveguides 12 may be fused or connected to one another along their lengths, or may diverge from one another at a point remote from the lens member 14. Alternately, a separable core optical fiber having two or more interconnected but physically-separable core and cladding structures may be utilized as the optical waveguides 12. The spacing of the cores of the optical waveguides 12 in the restricted-diameter region 24 may be controlled to less than the outside diameter of a single optical waveguide 12.

Figure 4:
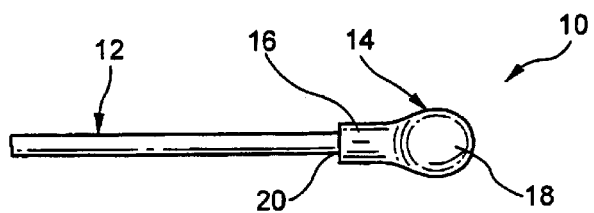
FIG. 4 is a micrograph showing an optical waveguide lens of the embodiment depicted in FIG. 1 in which the optical waveguide has a diameter of approximately 125 µm, the throat portion has a cross-sectional dimension of approximately 200 µm, the spherical portion of the lens member has a diameter of approximately 400 µm, and the mode field diameter of the projected beam is approximately 50–100 µm measured at the beam waist.
Figure 5:
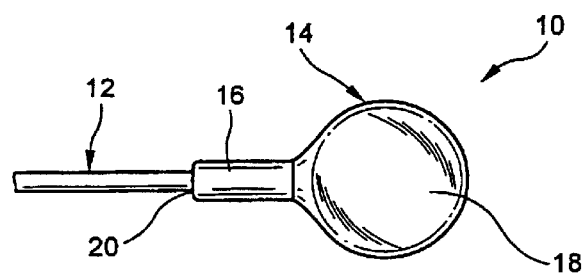
FIG. 5 is a micrograph showing an optical waveguide lens of the embodiment depicted in FIG. 1 in which the optical waveguide has a diameter of approximately 125 µm, the throat portion of the lens member has a cross-sectional dimension of between 200–250 µm, the spherical portion of the lens member has a diameter on the order of 1 mm, and the mode field diameter of the projected beam is approximately 100–250 µm measured at the beam waist.
Figure 6:
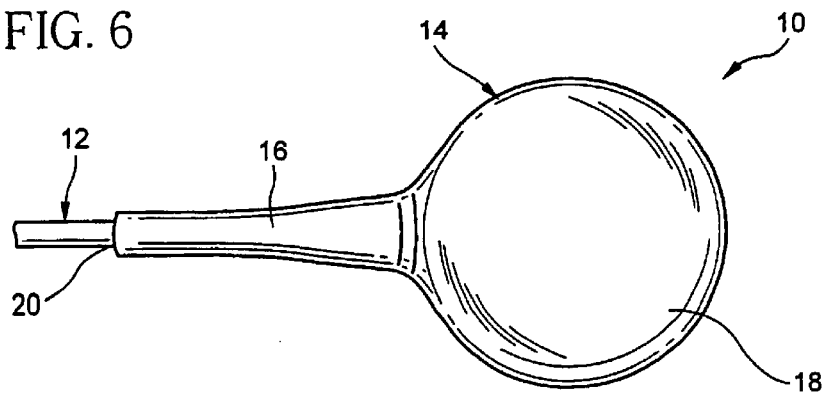
FIG. 6 is a micrograph showing an optical waveguide lens of the embodiment depicted in FIG. 1 in which the optical waveguide has a diameter of approximately 125 µm, the throat portion of the lens member has a cross-sectional dimension of between 200–300 µm, and the spherical portion of the lens member has a diameter on the order of 2 mm, and the mode field diameter of the projected beam is greater than 300 µm measured at the beam waist.

Referring to FIGS. 4–6, three representative examples of different size optical waveguide lenses 10 of the type depicted in FIG. 1 are shown. Each of these three optical waveguide lenses 10 would be suitable for different applications in collimating or focusing a light beam relative to the associated optical waveguide 12, and for the same optical waveguide 12 great variation in the cross-sectional dimensions of the throat portions 16, diameters of the spherical lens portions 18, and overall or combined lengths of the lens members 14 may be achieved.

For example, in FIG. 4 an optical waveguide 12 having a diameter of approximately 125 μm is fused to a throat portion 16 having a cross-sectional dimension of approximately 200 μm. The spherical portion 18 of the lens member 14 has a diameter of approximately 400 μm, and the mode field diameter of the projected beam is approximately 50–100 μm measured at the beam waist. In FIG. 5, the spherical portion 18 of the lens member 14 has a diameter on the order of 1 mm, and the mode field diameter of the projected beam is approximately 100–250 μm measured at the beam waist. In FIG. 6 the throat portion 16 of the lens member 14 has a cross-sectional dimension of between 200–300 μm, and the spherical portion 18 of the lens member 14 has a diameter on the order of 2 mm. The mode field diameter of the projected beam is greater than 300 μm measured at the beam waist, and optical waveguide lenses 10 having beam waists of 800–1000 μm can be fabricated for desired applications.

Figure 7:
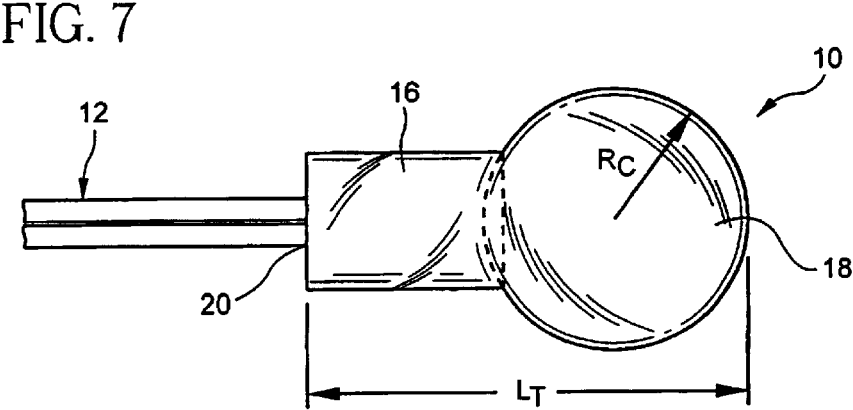
FIG. 7 is a diagram of an optical waveguide lens of the embodiment shown in FIG. 1 used to estimate the geometric volume of the lens member 14.

Referring to FIG. 7, the elements of the optical waveguide lens 10 are shown diagrammatically. Previously, the volume of the optical waveguide lens 10 was approximated by the combined volume of a sphere having a radius equal to the radius of curvature $R_C$ of the lens surface plus a cylinder having a diameter equal to the cross-sectional dimension of the throat portion 16. However, this first-order approximation is slightly incorrect and overestimates the volume of glass required for the lens member 14, as it does not account for the double-inclusion of the volume defined by the truncated spherical secant section (shown in phantom lines) representing the overlap between the sphere and cylinder. Conversely, if the cylinder is assumed to be tangent to the sphere, the first-order approximation of the volume of the lens member 14 does not include the volume of glass filling in the region between the face of the cylinder and the surface of the sphere around the tangent point, thus underestimating the volume of glass required to fabricate the lens member 14. A second-order approximation of the volume of the lens member 14 omitting the double-inclusion of the overlapping volume is easiest to calculate, but such an estimation including the tangential fill area could also be calculated for a lens member 14 having an overall or total length $L_T$.

Figure 8:
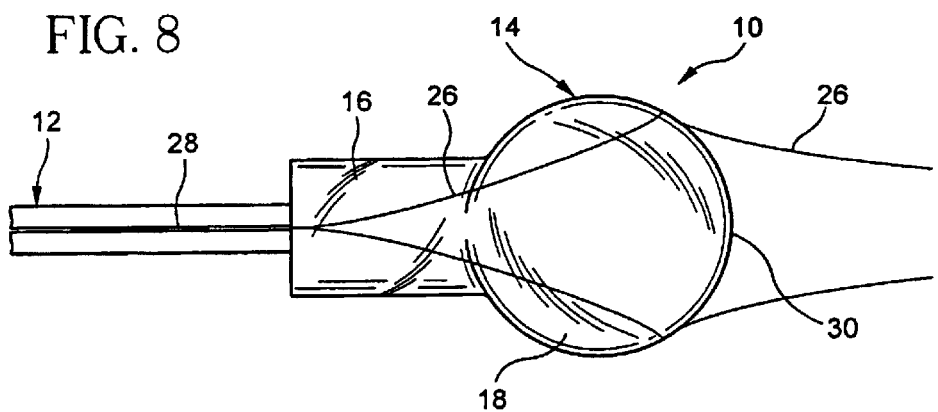
FIG. 8 is a diagram of an optical waveguide lens of the embodiment shown in FIG. 1 showing the light beam expanding from the optical waveguide within the throat portion and the spherical lens portion, refracting at the spherical lens surface, and the propagating beam diameter converging towards the beam waist.

Referring to FIG. 8, the optical waveguide lens 10 is again shown diagrammatically, and it will be appreciated that in simplified terms when the optical waveguide lens serves as a collimator the light beam 26 expands as it emerges from the core 28 of the optical waveguide 12, continues to expand via Gaussian diffusion as it passes through the throat portion 16 and spherical portion 18 of the lens member, refracts at the spherical surface 30 of the lens member 14, and then converges towards the beam waist. When the optical waveguide lens 10 serves as a focusing lens, the light beam 26 traverses the lens member 14 in the opposite direction or path, with the beam diameter focusing or decreasing rather than expanding.

Figure 9:
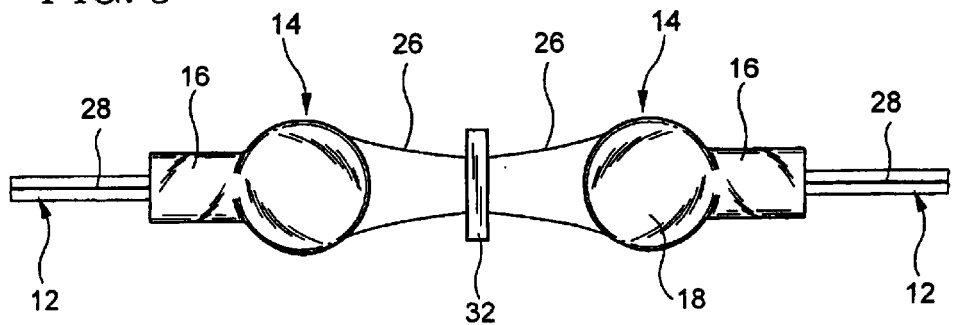
FIG. 9 is a diagram of a pair of optical waveguide lenses of the embodiment shown in FIG. 1, with the light beam propagating between the optical waveguide lenses, and an optical device disposed at the beam waist.

Referring to FIG. 9, a pair of optical waveguide lenses 10 are shown diagrammatically, each of the optical waveguide lenses 10 disposed on opposing sides of an optical device 32 such as a thin-film filter. The light beam 26 is expanded and collimated by one of the optical waveguide lenses 10, propagates through free space before interacting with the optical device 32 disposed approximately at the beam waist of the light beam 26, similarly propagates through free space to the opposing optical waveguide lens 10, and is focused by that optical waveguide lens 10 to the core 28 of the opposing optical waveguide 12. If the optical device 32 is only partially transmissive, a portion of the light beam 26 propagates through the optical device 32 as described, with the remaining portion of the light beam 26 being reflected back to the original optical waveguide lens 10. The surface 30 of the optical waveguide lenses 10 may therefore include an antireflective coating preventing or minimizing the portion of any undesirable backreflected light beam 26 which enters the optical waveguide lens 10 and is focused on the optical waveguide 12.

Figure 10:
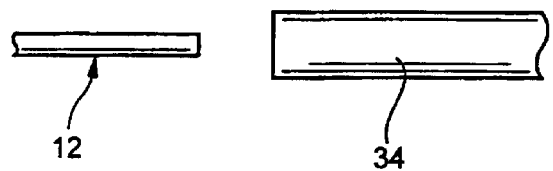
FIG. 10 is a diagrammatic depiction of a first step in a process for fabricating the optical waveguide lens of the present invention where a optical waveguide is aligned and brought into close proximate relationship with a lens blank.
Figure 11:
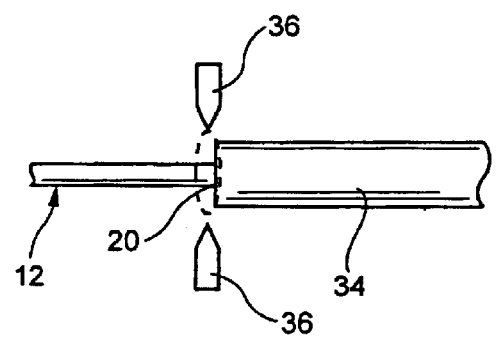
FIG. 11 is a diagrammatic depiction of the second step in the process for fabricating the optical waveguide lens of the present invention, where the optical waveguide fused to the lens blank.
Figure 12:
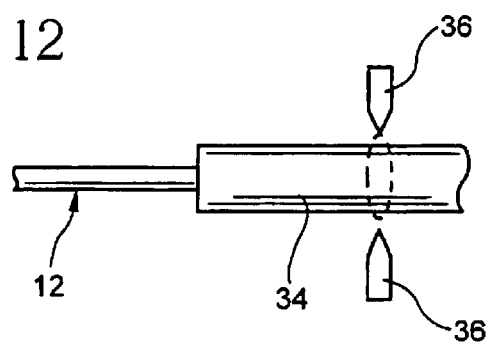
FIG. 12 is a diagrammatic depiction of the third step in the process for fabricating the optical waveguide lens of the present invention, where the heat source is backed off to a starting position along lens blank.
Figure 13:
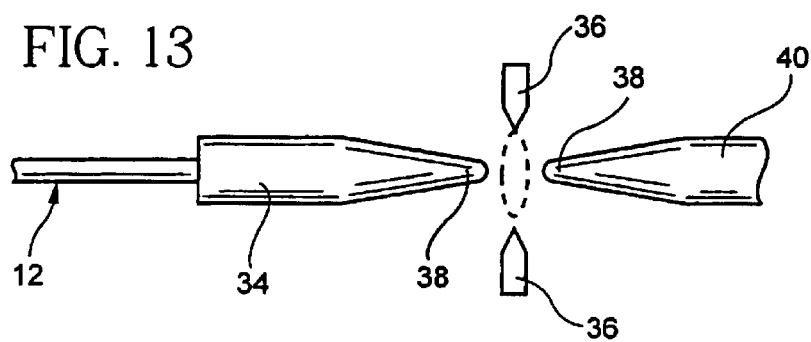
FIG. 13 is a diagrammatic depiction of the fourth step in the process for fabricating the optical waveguide lens of the present invention where the lens blank is separated and forms a tapered end.

Referring to FIGS. 10–15, a first embodiment of the process for fabricating the optical waveguide lens 10 of the present invention is shown diagrammatically. In FIG. 10, an optical waveguide 12 of the type selected for the optical waveguide lens 10 is gripped and positioned using a micropositioning stage (not shown) in the desired alignment with a lens blank 34. The lens blank 34 may be of any suitable length and cross-sectional shape, with a cylindrical embodiment being shown in FIG. 10. The lens blank 34 is similarly gripped and positioned using a micropositioning stage, with one or both of the optical waveguide 12 and lens blank 34 being moveable in the X, Y, and Z directions as well as angularly relative to one another. The optical waveguide 12 and lens blank 34 are moved into close confronting proximity or contact with one another, and in the vicinity of arc fusion splicer filaments 36 or a similar heating source, as shown in FIG. 11. Heat is applied and the optical waveguide 12 and lens blank 34 contact and are pressed against one another until fused together at the junction 20. The optical waveguide 12 and lens blank 34 are then backed off (or the arc fusion splicer filaments 36 are moved, or both), to a desired or predetermined location along the lens blank 34 as shown in FIG. 12. This position is determined based upon a first or second order estimate of the desired geometric volume of the final lens member 14 being fabricated. The lens blank 34 is heated and the portions on opposing sides of the arc fusion splicer filaments 36 are tensioned to draw and separate the lens blank 34 into two segments each having tapered ends 38 as shown in FIG. 13, one segment of which is the lens blank 34 attached to the optical waveguide 12, and the remaining segment 40 is held by the micropositioning stage and may be connected to a supply of lens blank 34 material. The tapered end 38 of the remaining segment 40 may be scored and separated to produce a clean end face and a new lens blank 34 to be used to fabricate a further lens member 14 on another optical waveguide 12.

Figure 14:
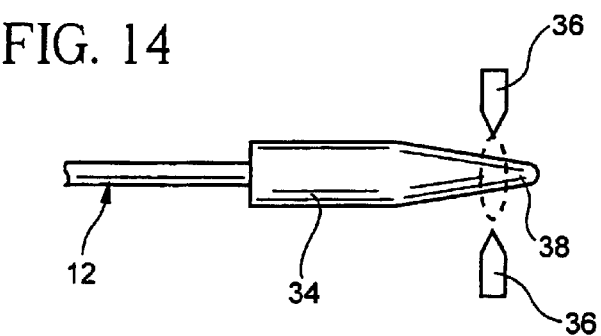
FIG. 14 is a diagrammatic depiction of the fifth step in the process for fabricating the optical waveguide lens of the present invention where the tapered end of the lens blank is heated to or above its softening point to form the spherical portion of the lens member.
Figure 15:
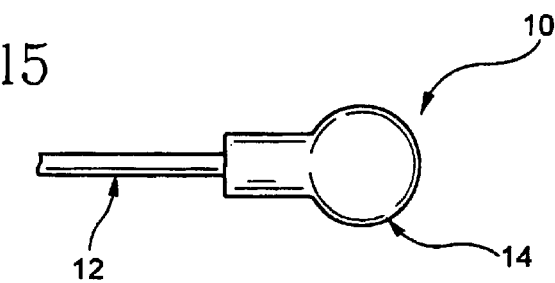
FIG. 15 is a diagrammatic depiction of the fifth step in the process for fabricating the optical waveguide lens of the present invention where the lens member defines a throat portion and a spherical lens portion, and is integrally connected to the optically waveguide.

The tapered end 38 of the lens blank 34 is then positioned proximate to the arc fusion splicer elements 36 as shown in FIG. 14, and heat is applied to the tapered end 38 of the lens blank 34 sufficient to raise the tapered end 38 of the lens blank 34 to or above its softening point, whereby the tapered end 38 of the lens blank 34 and a portion of the cylindrical lens blank 34 soften and melt sufficiently so that the surface tension of the viscous glass material forms the generally spherical portion 18 of the lens member 14, which is allowed to cool and results in the formation of a lens member 14 having a spherical portion 18 and a throat portion 16 as shown in FIG. 15, with the lens member 14 being integrally attached to the optical waveguide 12 to form the optical waveguide lens 10.

It will be appreciated that the tapered end 38 of the lens blank 34 may be approximated as having a volume equal to the sum of a truncated cone plus half a sphere, and the entire lens blank 34 attached to the optical waveguide 12 will have a volume approximated as a cylinder plus a truncated cone plus half a sphere. This volume would then be equal to the volume of the resulting lens element 14. These geometric volumes may thus be utilized in estimating the position of the lens blank 34 relative to the arc fusion splicer elements 36 or other heat source applied to the lens blank 34 to separate the lens blank 34 from the remaining segment 40. Depending upon the type and power of the heat source, the physical dimensions of the lens blank and resulting lens member 14, and characteristics of the glass material including its softening point, viscosity, and surface tension, a degree of variation in these dimensions will result, and proper and reproducible positioning of the lens blank 34 relative to the arc fusion splicer elements 36 or other heat source to fabricate precisely the desired lens length and radius of curvature will be achieved by empirical sampling.

Because the power requirements and heating times for fabricating the optical waveguide lens 10 are greater than those for splicing conventional silica optical fibers, it has proven suitable to use an arc fusion splicer employing slightly oversized or high-power electrodes to enhance their useful life, or a tungsten filament loop splicer rather than an arc fusion splicer. One example of the latter is a Vytran FFS-2000 splicer using a 15 ampere DC power supply. In such a case, the filament housing may be purged with argon or an argon-containing atmosphere at about 0.5–1.0 liters per minute or greater to prevent tungsten oxidation. A heating element having a shape closely conforming to the finished shape or surface of the lens member 14 may be utilized in the melt-back satge of forming the spherical portion 18 of the lens member 14. Another approach is to use a $CO_2$ laser as the heat source, with the beam being separated into four portions which converge on the optical waveguide 12 and lens blank 34 from four circumferentially spaced-apart directions to uniformly heat the target area of the lens blank 34.

It has proven suitable to use a lens blank 34 fabricated from a glass material having a softening point lower than the core 28 of the to optical waveguide 12. In the representative example of a standard single-mode optical waveguide 34 such as SMF-28 optical fiber available from Corning Incorporated of Corning, N.Y., the core 28 is a germania-doped silica.

One glass material which has proven suitable for use as the lens blank 34 in forming the lens member 14 of the optical waveguide lens 10 of this invention is a borosilicate glass, particularly a silica glass doped with 4 mole percent (mol %) of $B_2O_3$, conventionally referenced as 4 mol % $B_2O_3$—$SiO_2$ glass. The borosilicate glass splices well to standard single-mode fibers and other optical waveguides 12, and produces uniform and reproducible lens members 14 with select rates above 90% for a working distance of 4 mm. The use of borosilicate glass improves performance because fusion splicing a silica optical waveguide 12 with a borosilicate glass lens lank 34 causes thermal core broadening (i.e., on the order of 31% for splicing to either SMF-28 or large-effective-area non-zero dispersion shifted optical waveguides 12), which enlarges the mode field diameter and increases the tolerance for lateral misalignment of the optical waveguide 12 to the lens blank 34. Angular alignment must be closely controlled. A comparison of the filament powers used in the fabrication steps described above as between silica, germania-doped silica, and borosilicate glasses is instructive. As one representative example, in the process described above where splicing the optical waveguide 12 to a silica lens blank 34 will require 20–21 watts of filament power or 19 watts for germania-doped silica, only 18 watts are required for borosilicate glass. In taper cutting the lens blank 34, the corresponding figures are 26 watts for silica, 24 watts for germania-doped silica, and 21 watts for borosilicate glass. In melt back to form the spherical lens portion 18, the corresponding figures are 31 watts for silica, 26 watts for germnania-doped silica, and 24 watts for borosilicate glass. Standard properties of the borosilicate glass include a softening point of 1520° C., an $n_D$ of 1.457, $\alpha$ of $9 \times 10^{-7}$ $deg^{-1}$, an annealing temperature of 999° C., strain point of 910° C., elasticity of $9.2 \times 10^6$ psi, $\alpha$ of $4.6 \times 10^{-7}$ $deg^{-1}$ at the strain point, In $\eta_0$ of −8.793 poise (where $\theta_0$ is viscosity at infinite temperature), and Q (activation energy divided by gas constant) of 49520 (K). A plot of viscosity as a function of temperature shows that borosilicate glass has a slope less than that for silica, allowing the use of lower temperatures for fabricating the optical waveguide lens 10 of the present invention.

Figure 16:
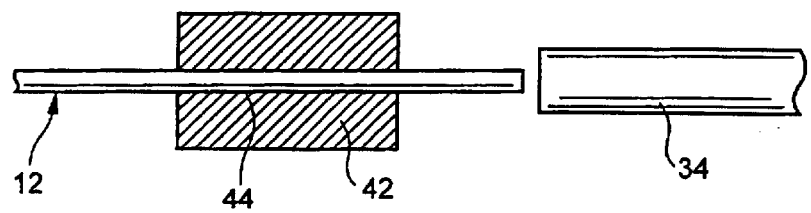
FIG. 16 is a diagrammatic depiction of a first step in a process for fabricating the optical waveguide lens of the present invention having a ferrule, where a optical waveguide is inserted through a bore in the ferrule and aligned and brought into close proximate relationship with a lens blank.
Figure 17:
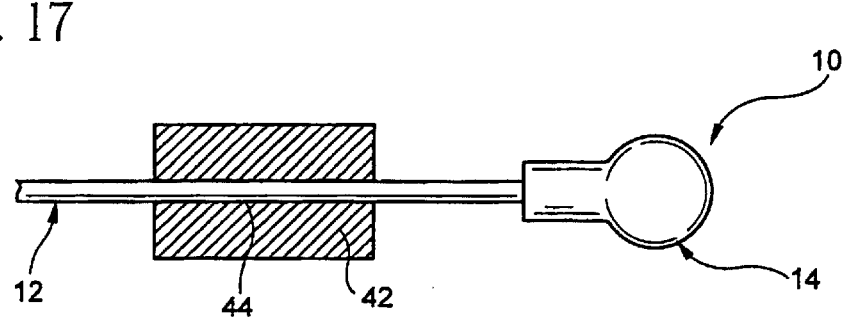
FIG. 17 is a diagrammatic depiction of the second step in the process for fabricating the optical waveguide lens of the present invention having a ferrule, where the lens member is fabricated from the lens blank.
Figure 18:
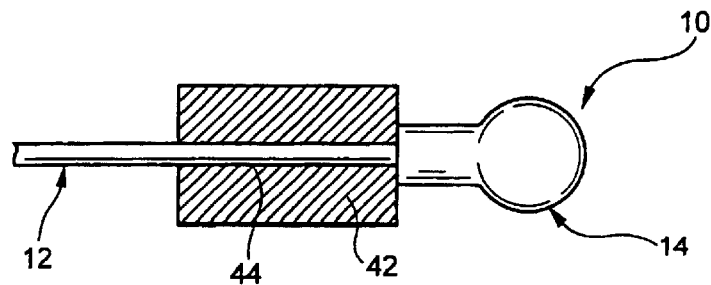
FIG. 18 is a diagrammatic depiction of the third step in the process for fabricating the optical waveguide lens of the present invention having a ferrule, where the optical waveguide is retracted through the bore of the ferrule so the lens member contacts the ferrule and is secured in position relative to the ferrule.

Referring to FIGS. 16–18, a method for mounting the optical waveguide lens 10 of the present invention in a ferrule 42 is shown. The ferrule 42 may be any conventional ferrule 42 of the type used in fabricating optical components, fabricated from glass, ceramic, glass-ceramic, or metal. The ferrule 42 may have a flat, conical, or concave front surface (not shown) The ferrule 42 defines a bore 44 through which the optical waveguide 12 is inserted, such that the distal tip of the optical waveguide 12 extends sufficiently from the ferrule 42 as shown in FIG. 16. A lens blank 34 is fused to the optical waveguide 12, and a lens member 14 is formed as shown in FIG. 17. The optical waveguide 12 is then retracted through the bore 44 of the ferrule 42 until a portion of the lens member 14 contacts and is seated against the front face of the ferrule 42 (or alternately seated partially or totally within a recess defined in the front face of the ferrule 42), and the lens member 14 is secured to the ferrule using an adhesive or other suitable fastening or mounting technique as shown in FIG. 18.

Figure 19:
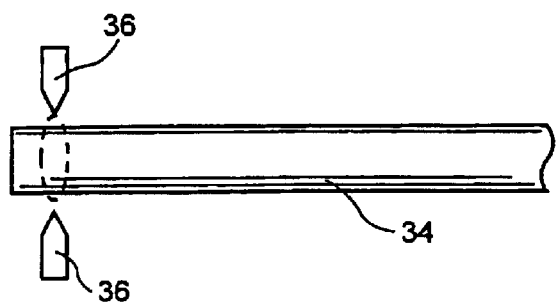
FIG. 19 is a diagrammatic depiction of a first step in a process for fabricating an optical waveguide lens of the present invention having an integral mounting post, where the distal end of a continuous stock of lens blank material is heated to form an optical waveguide lens having a spherical lens portion.
Figure 20:
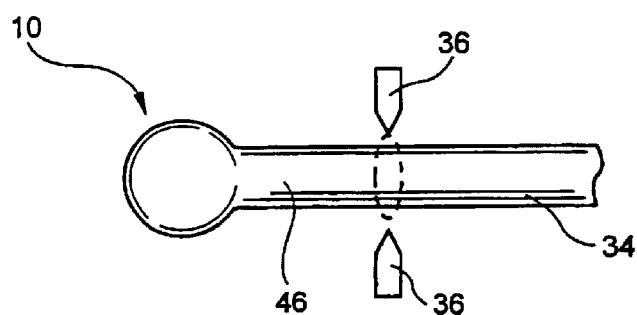
FIG. 20 is a diagrammatic depiction of the second step in a process for fabricating an optical waveguide lens of the present invention having an integral mounting post, where the heat source is backed off along the lens blank to a position remote from the spherical lens portion of the optical waveguide lens to separate the optical waveguide lens and a portion of the lens blank from the continuous stock.
Figure 21:
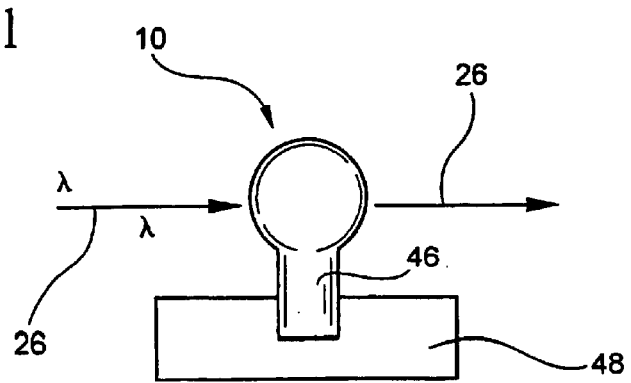
FIG. 21 is a diagrammatic depiction of the third step in a process for fabricating an optical waveguide lens of the present invention having an integral mounting post, where the mounting post is secured to a substrate with the optical waveguide lens oriented for transverse propagation of a light beam.

Referring to FIGS. 19–21, an automated method for fabricating a lens member 14 having an integral mounting post 46 is depicted which utilizes the processes of the present invention. A lens blank 34 of a continuous feed stock of glass material is provided, the distal end of which is heated to form a generally spherical lens member 10 as shown in FIG. 21. The lens blank 34 is then heated and separated at a position remote to the lens member 10, to form the lens member 10 having an integrally formed mounting pot 46 extending therefrom. The lens member 10 is mounted by securing the mounting post 46 in a suitable substrate 48 or other fixture at the position and orientation desired for operation, such that a light beam 26 will propagate through the lens member 10 at an angle generally perpendicular relative to the orientation of the mounting post 46.

Figure 22:
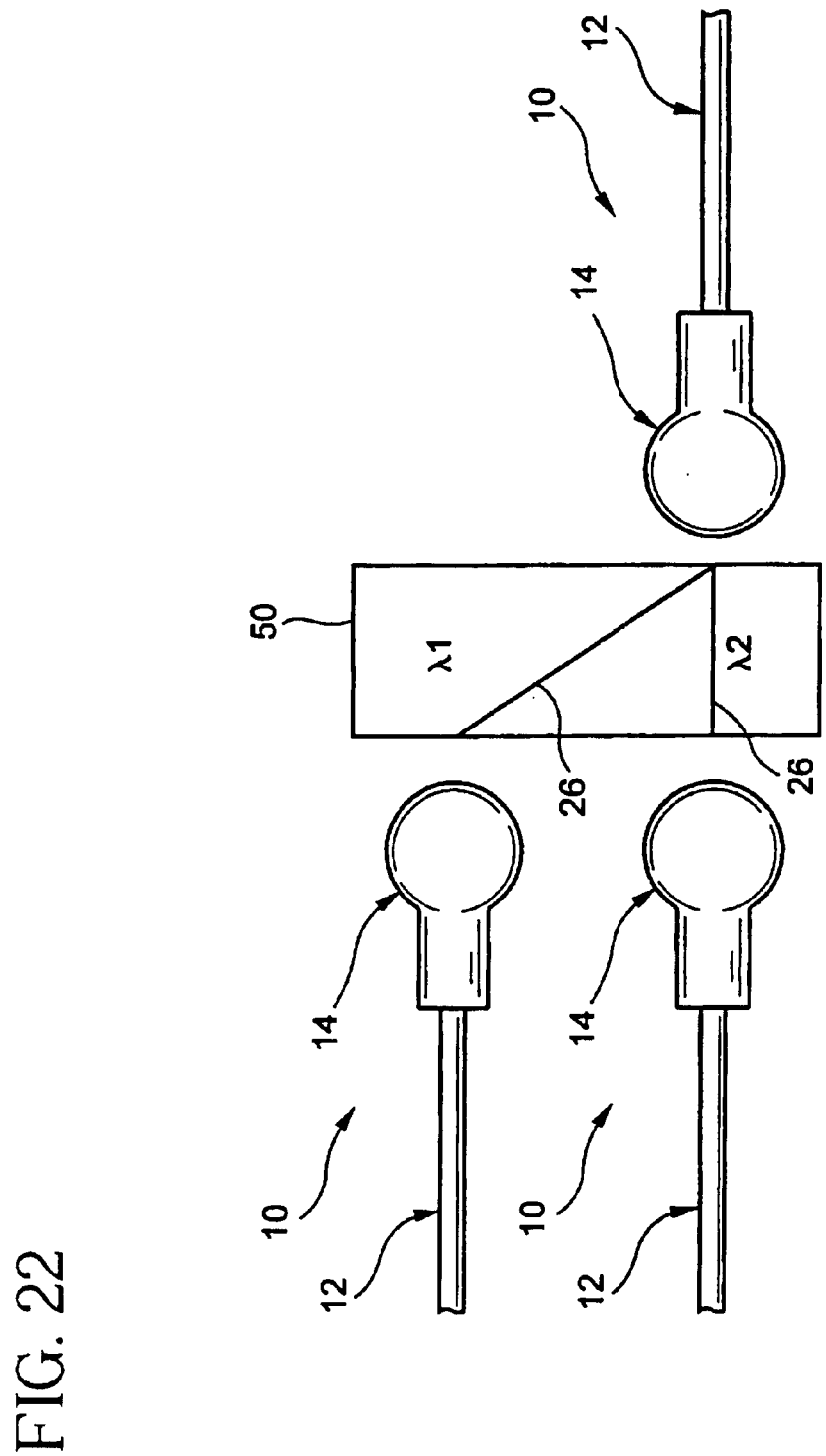
FIG. 22 shows an optical component such as a pump multiplexer fabricated using a plurality of optical waveguide lenses of the present invention.

Referring to FIG. 22, a representative example of an optical component such as multiplexer fabricated using a plurality of the optical waveguide lenses 10 of the present invention is shown. It is understood that this diagrammatic depiction is not to scale, and that the propagation of the light beams 26 is representative of function only. In the multiplexer, a pair of the optical waveguide lenses 10 are each spaced apart and optically connected to parallel input waveguides 12, through each of which propagates a different wavelength of light $\lambda 1$, $\lambda 2$ respectively. The light beams 26 may each have different optical properties preselected or predetermined for the function of the optical component, for example orthogonal polarizations. The light beams 26 are expanded and collimated, and propagate from each of the optical waveguide lenses 10 through free space into a birefringent element 50 which acts on each of the light beams 26 in a characteristic manner, such as by causing a refractive angular shift of one polarization but not the other. In the exemplary multiplexer, the birefringent element 50 causes the light beams to converge towards one another, and exit the opposing face of the birefringent element 50 and propagate through free space to a third optical waveguide lens 10 whereat both light beams 26 for the two wavelengths of light λ1, λ2 are focused onto a common optical waveguide 12. Such a multiplexer may be utilized for combining a transmission signal at one wavelength λ1 from a first input waveguide 12 with a pump laser source from a second input waveguide 12 at another wavelength λ2 onto a common output waveguide 12 carrying both wavelengths λ1, λ2.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical waveguide lens for collimating or focusing a light beam, the light beam having a mode field diameter measured at a beam waist when the light is transmitted through the optical waveguide lens into free space, the optical waveguide lens comprising:
   an optical waveguide having an end through which the light propagates and a diameter; and
   a lens member connected to and extending from the end of the optical waveguide, the lens member having a throat portion and a generally spherical lens portion, the throat portion having a cross-sectional dimension substantially greater than the diameter of the optical waveguide.

2. The optical waveguide lens of claim 1 wherein the optical waveguide has a core and a cladding, the core being fabricated from a doped glass having a softening point, and wherein the lens member is fabricated from a generally homogenous glass having a softening point less than the softening point of the core of the optical waveguide.

3. The optical waveguide lens of claim 1 wherein the lens member is fabricated from a generally homogenous glass including a borosilicate glass.

4. The optical waveguide lens of claim 1 wherein the lens member is fabricated from a 4 weight percent borosilicate glass.

5. The optical waveguide lens of claim 1 wherein the optical waveguide has a diameter on the order of 125 microns and the cross-sectional dimension of the throat portion is greater than 135 microns.

6. The optical waveguide lens of claim 1 wherein the optical waveguide has a diameter on the order of 125 microns and the cross-sectional dimension of the throat portion is greater than 200 microns.

7. The optical waveguide lens of claim 1 wherein the cross-sectional dimension of the throat portion of the lens member is about 1.5 or more times diameter of the optical waveguide.

8. The optical waveguide lens of claim 1 wherein the mode field diameter of the light beam measured at the beam waist is greater than 30 microns.

9. The optical waveguide lens of claim 1 wherein the mode field diameter of the light beam measured at the beam waist is greater than 120 microns.

10. The optical waveguide lens of claim 1 wherein the mode field diameter of the light beam measured at the beam waist is greater than 200 microns.

11. The optical waveguide lens of claim 1 wherein the mode field diameter of the light beam measured at the beam waist is greater than 500 microns.

12. The optical waveguide lens of claim 1 wherein the mode field diameter of the light beam measured at the beam waist is between 200 and 800 microns.

13. The optical waveguide lens of claim 1 wherein the optical waveguide is selected from a group consisting of a single-mode optical fiber, a multi-mode optical fiber, a polarization-maintaining optical fiber, a dual-core optical fiber, a separable-core optical fiber, a circular cross-section optical fiber, and a non-circular cross-section optical fiber.

14. An optical waveguide lens for collimating or focusing a light beam, the optical waveguide lens comprising:
   an optical waveguide having a core, a cladding, and an end through which the light propagates, the core being fabricated from a glass having a softening point; and
   a lens member connected to and extending from the end of the optical waveguide, the lens member having a generally spherical lens portion, the lens member being fabricated from a glass having a softening point that is less than the softening point of the core of the optical waveguide.

15. The optical waveguide lens of claim 14 wherein the optical waveguide has an axis, and the lens member has a generally uniform refractive index which does not vary in a radial direction measured relative to the axis of the optical waveguide.

16. The optical waveguide lens of claim 14 wherein the lens member is fabricated from a generally homogenous borosilicate glass.

17. The optical waveguide lens of claim 16 wherein the lens member is fabricated from a 4 weight percent borosilicate glass.

18. A method for fabricating an optical waveguide lens for collimating or focusing a light beam, the method comprising the steps of:
   providing an optical waveguide having an end through which the light beam is transmitted, a diameter, and an axis;
   providing a lens blank, the lens blank having a face defining a cross-sectional dimension substantially greater than the diameter of the optical waveguide, the lens blank having a softening point;
   attaching the lens blank to the optical waveguide such that the end of the optical fiber contacts and is fused to the face of the lens blank;
   heating a portion of the lens blank above the softening point;
   applying tension to the lens blank such that the lens blank is drawn and separated to form a tapered distal end connected to and extending from the optical waveguide; and
   heating the tapered distal end of the lens blank above the softening point such that a generally spherical lens portion having a diameter is formed in general alignment with the axis of the optical waveguide and through which the light beam is transmitted, and such that a throat portion of the lens blank disposed between the optical waveguide and the generally spherical lens portion has a cross-sectional dimension substantially greater than the diameter of the optical waveguide and substantially less than the diameter of the generally spherical lens portion.

19. The method of claim 18 wherein the lens blank is a generally homogenous borosilicate glass.

20. The method of claim 19 wherein the lens blank is a 4 weight percent borosilicate glass.

21. A method for fabricating an optical component wherein a light beam propagates through free space relative to an optical device, the method comprising the steps of:
providing an optical waveguide lens including an optical waveguide having a diameter and an axis, a throat portion connected to and extending from the optical waveguide, the throat portion having a cross-sectional dimension substantially greater than the diameter of the optical waveguide, and a generally spherical lens portion connected to and extending from the throat portion, the generally spherical lens portion having a diameter substantially greater than the cross-sectional dimension of the throat portion;
positioning the optical waveguide lens relative to the optical device such that the light beam propagates either from the optical waveguide lens to the optical device or from the optical device to the optical waveguide lens or both; and
securing the optical waveguide lens relative to the optical device.

22. The method of claim 21 wherein the optical waveguide has a core fabricated from a glass material having a softening point, the optical waveguide lens being fabricated from a glass material having a softening point which is less than the softening point of the core.

23. The method of claim 21 wherein the optical waveguide lens is fabricated from a borosilicate glass material.

24. The method of claim 23 wherein the optical waveguide lens is fabricated from a 4 weight percent borosilicate glass.

25. The method of claim 21 wherein the optical waveguide lens collimates the light beam propagating from the optical waveguide into the free space.

26. The method of claim 21 wherein the optical waveguide lens focuses the light beam propagating from the free space into the optical waveguide.

27. The method of claim 21 wherein the optical device is a passive optical component.

28. The method of claim 21 wherein the optical device is an active optical component.

29. The method of claim 21 wherein the optical device is selected from a group consisting of a multiplexing component or a demultiplexing component.

30. The method of claim 21 wherein the optical device is selected from a group consisting of a switch component, a router component, or an optical add/drop component.

31. A method for fabricating an optical waveguide lens assembly comprising the steps of:
providing an optical waveguide having a diameter and a distal end;
providing a ferrule defining a bore extending therethrough, the bore having a diameter equal to or greater than the diameter of the optical waveguide, the ferrule having an end surface;
inserting the optical waveguide through the bore such that a segment of the distal end of the optical waveguide is exposed;
forming a lens member on the distal end of the optical waveguide, the lens member including a generally spherical portion;
retracting the optical waveguide through the bore such that a portion of the lens member contacts the end surface of the ferrule; and
securing the optical waveguide in position relative to the ferrule.

32. A method for fabricating a plurality of generally spherical lenses each having a mounting post extending therefrom, the method comprising the steps of:
providing an elongated stock of a glass material from which the plurality of generally spherical lenses are to be formed, the glass material having a softening point, the elongated stock having a distal end and a cross-sectional dimension;
integrally forming a generally spherical lens on the distal end of the elongated stock by heating the glass material above its softening point such that a portion of the elongated stock forms the spherical lens due in part to a surface tension of the glass material, the generally spherical lens having a diameter substantially greater than the cross-sectional dimension of the elongated stock;
separating the generally spherical lens and a segment of the elongated stock connected to the generally spherical lens from a remaining portion of the elongated stock, such that the segment of the elongated stock connected to the generally spherical lens forms the mounting post for the generally spherical lens; and
repeating the forming step and the separating step to fabricate the plurality of generally spherical lenses each having the mounting post extending therefrom.

33. An optical waveguide lens for collimating or focusing a light beam comprising:
an optical waveguide having an end through which the light propagates and a diameter; and a lens member integrally attached and extending from the end of the optical waveguide, the lens member having a generally spherical lens portion, the lens member being fabricated from a borosilicate glass.

34. An optical waveguide lens assembly for collimating or focusing a light beam, the optical waveguide lens assembly comprising:
an optical waveguide having a core, a cladding, and an end; and
a lens member connected integrally to the end of the optical waveguide, the lens member having a throat portion and a lens portion, the optical waveguide being connected to the throat portion, the throat portion having a cross-sectional dimension that differs substantially from the diameter of the optical waveguide at or proximate to a point where the throat portion is connected to the end of the optical waveguide.

35. The optical waveguide lens assembly of claim 34 wherein the core of the optical waveguide is a glass having a softening point, and wherein the throat portion of the lens member is a glass having a softening point that is less than the softening point of the core of the optical waveguide.

36. The optical waveguide lens assembly of claim 35 wherein the lens member is fabricated from a borosilicate glass.

37. The optical waveguide lens assembly of claim 36 the borosilicate glass is four weight percent (4 wt%) borosilicate glass.

38. The optical waveguide lens assembly of claim 34 wherein the cross-sectional dimension of the throat portion differs from the diameter of the optical waveguide by eight percent (8%) or more.

39. The optical waveguide lens assembly of claim 34 wherein the cross-sectional dimenstion of the throat portion differs from the diameter of the optical waveguide by sixty percent (60%) or more.

40. The optical waveguide lens assembly of claim 34 wherein the cross-sectional dimension of the throat portion differs from the diameter of the optical waveguide by ten microns or more.

41. The optical waveguide lens assembly of claim 34 the cross-sectional dimension of the throat portion differs from the diameter of the optical waveguide by seventy-five microns or more.

* * * * *